United States Patent
Rosnell et al.

(10) Patent No.: US 7,403,750 B2
(45) Date of Patent: Jul. 22, 2008

(54) REUSE OF DIGITAL-TO-ANALOG CONVERTERS IN A MULTI-MODE TRANSMITTER

(75) Inventors: Seppo Rosnell, Salo (FI); Mika Salmi, Turku (FI); Simo Murtojärvi, Salo (FI)

(73) Assignee: Nokia Corporation, Espoo (FI)

( * ) Notice: Subject to any disclaimer, the term of this patent is extended or adjusted under 35 U.S.C. 154(b) by 457 days.

(21) Appl. No.: 11/114,732

(22) Filed: Apr. 25, 2005

(65) Prior Publication Data

US 2006/0240789 A1    Oct. 26, 2006

(51) Int. Cl.
*H04B 1/04* (2006.01)
(52) U.S. Cl. ............. 455/127.4; 455/73; 455/168.1; 455/39; 455/552.1; 375/295; 375/316
(58) Field of Classification Search ......... 455/127.4, 455/73, 168.7, 39, 552.1, 190.1; 375/295, 375/316
See application file for complete search history.

(56) References Cited

U.S. PATENT DOCUMENTS

| | | | |
|---|---|---|---|
| 5,872,809 A * | 2/1999 | Batruni | 375/219 |
| 7,035,595 B1 | 4/2006 | Kim et al. | |
| 7,183,949 B2 * | 2/2007 | Park | 341/61 |
| 2003/0078011 A1 | 4/2003 | Cheng et al. | |
| 2004/0052312 A1 | 3/2004 | Matero | |
| 2006/0006986 A1 * | 1/2006 | Gravelle et al. | 340/10.3 |
| 2006/0209986 A1 * | 9/2006 | Jensen et al. | 375/302 |

FOREIGN PATENT DOCUMENTS

| | | |
|---|---|---|
| WO | 00/31885 A1 | 6/2000 |
| WO | 01/24356 A1 | 4/2001 |
| WO | 03/061174 A2 | 7/2003 |

* cited by examiner

*Primary Examiner*—Sanh D. Phu
(74) *Attorney, Agent, or Firm*—Ware, Fressola, Van Der Sluys & Adolphson LLP

(57) ABSTRACT

A transmitter for generating modulated signals is shown, wherein in a first-type operating mode, a first digital signal is input into a digital-to-analog converter to obtain a first analog signal that is input into a first-type unit, in which a first-type modulated signal is generated in dependence on at least the first analog signal; and wherein in a second-type operating mode, a second digital signal is input into the digital-to-analog converter to obtain a second analog signal that is input into a second-type unit, in which a second-type modulated signal is generated in dependence on at least the second analog signal. Correspondingly, a wireless communication device is shown, as well as a base station, a module in a wireless communication device, a module in a base station, an integrated circuit, a method, a computer program and a computer program product.

24 Claims, 6 Drawing Sheets

REUSE OF DIGITAL-TO-ANALOG CONVERTERS IN A MULTI-MODE TRANSMITTER

FIELD OF THE INVENTION

This invention relates to a transmitter that is capable of generating at least first-type modulated signals and second-type modulated signals. The invention correspondingly further relates to a wireless communication device, a base station, a module in a wireless communication device, a module in a base station, an integrated circuit, a method, a computer program and a computer program product.

BACKGROUND OF THE INVENTION

The consumer's growing demand for flexibility and for availability of a variety of services in electronic devices presently pushes forward the miniaturization of device components that implement these services. In the context of mobile phones, after the incorporation of transceivers that are operable in different frequency bands of the second generation mobile radio standards (e.g. the Global System for Mobile Communications, GSM) into so-called dual- and tri-band mobile phones, recent activities are directed to integrate transceivers for both the second and third generation mobile radio standards, with the Universal Mobile Telecommunications System (UMTS) as a representative of the latter type of standard, into so-called multi-mode mobile phones.

The prior art approach to set-up, for instance, a dual-mode transmitter for a dual-mode mobile phone is to design a first transmitter operable according to a first mobile radio standard and a second transmitter operable according to a second mobile radio standard, and then to separately integrate the designed transmitters into the dual-mode transmitter. This approach, however, does not account for the fact that the first and second transmitter will, during operation of the dual-mode mobile phone, not be used concurrently, and thus causes comparably large dimensions and weight of the dual-mode transmitter.

SUMMARY OF THE INVENTION

In view of the above-mentioned problems, the present invention proposes a transmitter, comprising a digital-to-analog converter for converting a digital signal into an analog signal; means arranged for inputting, in a first-type operating mode of said transmitter, a first digital signal into said digital-to-analog converter to obtain a first analog signal, and for inputting, in a second-type operating mode of said transmitter, a second digital signal into said digital-to-analog converter to obtain a second analog signal; a first-type unit for generating a first-type modulated signal in dependence on at least said first analog signal; a second-type unit for generating a second-type modulated signal in dependence on at least said second analog signal, and means arranged for inputting, in said first-type operating mode, said first analog signal into said first-type unit, and for inputting, in said second-type operating mode, said second analog signal into said second-type unit.

Said transmitter may for instance be comprised in a wireless communication device or in a base station of a wireless communications system, as for instance a cellular radio system or a wireless local area network.

Said transmitter is at least capable of generating first-type modulated signals in a first-type operating mode, and of generating second-type modulated signals in a second-type operating mode. Said first- and second-type signals may for instance differ in their modulation technique and/or by the frequency band used, or by other transmission-related features. Therein, modulation is understood as the process of adding information to a signal carrier, as it is for instance the case with amplitude, frequency or phase modulation or combinations thereof.

Said first- and second type signals may for instance be signals that obey different standards, for instance different mobile radio standards.

Said operating modes are exclusive in a way that said transmitter is either in said first-type operating mode or in said second-type operating mode. It is readily understood that the transmitter may equally well be capable of generating more than two types of modulated signals in corresponding operating modes.

Said transmitter comprises a digital-to-analog converter (DAC), which converts digital signals into analog signals. Therein, digital signals are understood as discrete in both time and value, wherein analog signals are understood to be continuous in both time and value. Said transmitter comprises means that take care of the proper feeding of the DAC and the first-type and second-type unit with signals according to the present operating mode. Said means may for instance be switches that are controlled according to the present operating mode. In said first-type operating mode, said means input a first digital signal into said DAC, which converts the first digital signal into a first analog signal. Said first analog signal then is input into said first-type unit to at least influence the generation of said first-type modulated signal. Similarly, in said second-type operating mode, a second digital signal is fed to said DAC to be converted into said second analog signal, which then is fed to said second-type unit to at least influence the generation of said second-type modulated signal.

Said first and second digital signals input into said DAC may for instance be output by a digital signal processor, and may represent both data and control signals. For instance, said digital signals may be actual data signals that are to be transmitted by the transmitter, for instance sampled speech data in a cellular telephone system, or may be a signal for the power control of said modulated signals.

According to the present invention, said DAC is shared by said first-type unit that generates said first-type modulated signal and said second-type unit that generates said second-type modulated signal, instead of using a first DAC for the conversion of said first digital signal into said first analog signal and a second DAC for the conversion of said second digital signal into said second analog signal. Sharing of said DAC in said transmitter is possible because the operating modes, in which the first-type and second-type units are active, are exclusive, so that said DAC can be used in time-multiplex. The routing of the first and second digital signals into the DAC and the routing of the first and second analog signals out of the DAC to the first-type and second-type units is accomplished by specific means, for instance switches, that add by far less costs to the transmitter than the saved DAC would have done. In the context of multi-mode transmitters, the present invention can thus be deployed to reduce costs of multi-mode transmitters as compared to prior art solutions.

According to an embodiment of the transmitter of the present invention, said first-type modulated signal is a wideband modulated signal, and said second-type modulated signal is a narrowband modulated signal. Therein, a wideband modulated signal may be characterized by a modulated signal bandwidth that is not substantially smaller than the overall available transmission bandwidth of the system, as it is for instance the case in the Wideband Code Division Multiple Access (W-CDMA) variant of the UMTS, where the modulated signal bandwidth equals the overall available transmission bandwidth of the system. Similarly, a narrowband modulated signal may be characterized by a modulated signal bandwidth that is substantially smaller than the overall available transmission bandwidth of the system, as it is for instance the case in the GSM system. Said wideband modulated signal may for instance be modulated by a quadrature amplitude modulator, and said narrowband modulated signal may for instance be modulated by an Envelope Elimination and Restoration (EER) modulator.

According to a further embodiment of the transmitter of the present invention, said wideband modulated signal is a spread spectrum signal. Said wideband modulated signal may then for instance have been obtained by spreading (chip-level multiplying) a modulated signal with a spreading code consisting of a number of binary chips, wherein the duration of each chip is smaller than the symbol duration of said modulated signal. Said first-type unit then may comprise a spreading instance. Said spread spectrum signal may for instance be a signal in a Code Division Multiple Access (CDMA) system.

According to a further embodiment of the transmitter of the present invention, said first-type unit comprises a power control unit for controlling a power of said first-type modulated signal, and said first analog signal controls said power control unit. Said power control may for instance be required to adjust the transmission power of said first-type modulated signal so that signal attenuation during transmission due to path loss, shadowing and fading is compensated while not unnecessarily increasing interference caused by the transmitted first-type modulated signal. A suited power level of said first-type modulated signal may then be determined by a power control instance, for example by open-loop or closed-loop power control techniques, and controlled by outputting said first digital signal, which is converted into said first analog signal by said DAC and then adjusts said power control unit accordingly.

According to a further embodiment of the transmitter of the present invention, said first-type unit comprises a power amplifier for amplifying a power of said first-type modulated signal, and said first analog signal controls a supply voltage for said power amplifier via a switching mode power supply unit. Said power amplifier takes care of the actual amplification of the power of said first-type modulated signal. A supply voltage of said power amplifier is controlled by a switching mode power supply unit, which may be a power supply that provides a power supply function through low loss components such as capacitors, inductors, and transformers, and the use of switches that are in one of two states, on or off. The switches may dissipate very little power in either of these two states, and power supply may then be accomplished with small power loss and high efficiency. Controlling the supply voltage of said power amplifier may be advantageous because peak supply voltages are required by said power amplifier only for peak power amplification, so that power may be saved by reducing the supply voltage in periods where no peak power amplification of the power of the first-type modulated signal is required.

According to a further embodiment of the transmitter of the present invention, said first-type unit comprises a modulator that generates at least a representation of said first-type modulated signal as a quadrature-amplitude modulated signal from an analog quadrature signal and an analog in-phase signal that are input into said modulator, and said first analog signal is one of said analog quadrature signal and said analog in-phase signal.

Said quadrature-amplitude modulator may for instance be suited for phase and/or amplitude modulation. Said analog in-phase and quadrature signals are representations of digital in-phase and quadrature signals, which may for instance be output by a digital signal processor. These digital in-phase and quadrature signals may for instance be generated from a sequence of data bits by means of a mapping table that maps tuples of subsequent data bits biuniquely onto signal points in a complex-valued signal plane that is spanned by a real axis and an imaginary axis, wherein the digital in-phase signal represents the real axis coordinates of these signal points and the digital quadrature signal represents the imaginary axis coordinates of these signal points. Said analog in-phase and quadrature signals may be modulated by multiplying them with phase-shifted sinusoids and adding the result to obtain said representation of said first-type modulated signal. Said representation of said first-type modulated signal may either be said first-type modulated signal itself, or may become said first-type modulated signal by further processing steps performed in said first-type unit, as for instance power control, spreading, and/or power amplification.

According to a further embodiment of the transmitter of the present invention, said second-type unit comprises a modulator for at least partially performing envelope elimination and restoration at least partially based on said second analog signal to obtain said second-type modulated signal. In Envelope Elimination and Restoration (EER), a (digital) data signal is represented by a digital phase signal and a digital amplitude signal. These digital phase and amplitude signals may for instance first be generated by a digital signal processor from a sequence of data bits contained in said digital data signal by means of a mapping table that maps tuples of subsequent data bits biuniquely onto signal points in a complex-valued signal plane, wherein the digital phase signal then indicates the phase of the signal points with respect to a reference axis of this signal plane, and the digital amplitude signal indicates the distance of the signal points from the origin of the signal plane. The phase signal and the amplitude signal as generated by said digital signal processor then are combined in said modulator of said second type unit to obtain said second-type modulated signal by inputting a phase-modulated representation of said digital phase signal into a power amplifier, the amplification of which is modulated with the digital amplitude signal. This may allow for the use of a non-linear power amplifier, as the phase-modulated signal has a constant amplitude.

According to a further embodiment of the transmitter of the present invention, said modulator comprises a phase modulator for generating a phase-modulated signal based on a digital phase signal of a data signal, and a power amplifier for amplifying a power of said phase-modulated signal, and wherein a supply voltage for said power amplifier is controlled by an analog representation of a digital amplitude signal of said data signal via a switching mode power supply unit. Said switching mode power supply unit may also be replaced by a linear regulator. Such a replacement may however reduce the efficiency of the transmitter.

According to a further embodiment of the transmitter of the present invention, said analog representation of said digital amplitude signal of said data signal is said second analog signal.

According to a further embodiment of the transmitter of the present invention, said phase modulator comprises a phase-locked loop, a pre-emphasis instance and a sigma-delta modulator, wherein a digital frequency signal, which is obtained from said digital phase signal by differentiation, is emphasized in said pre-emphasis instance and then input into said sigma-delta modulator, wherein an output signal of said sigma-delta modulator controls said phase-locked loop, and wherein said phase-locked loop outputs said phase-modulated signal.

Said phase modulator then may be implemented as sigma-delta controlled fractional-N phase-locked loop and performs single-point modulation. If single-point modulation is used, pre-emphasis may usually be required because a phase-locked loop exhibits a narrowband low-pass response. The reason for this narrowband response is related to the stringent phase-noise requirement for the phase modulator (i.e. phase-locked loop) output. Since a phase-locked loop acts as a frequency-modulator, said digital frequency signal, and not said digital phase signal, is directed to the sigma-delta modulator. Said digital frequency signal may for instance be generated by a differentiator in said phase modulator.

According to a further embodiment of the transmitter of the present invention, said phase modulator comprises a phase-locked loop and a sigma-delta modulator, wherein said phase-locked loop comprises a voltage controlled oscillator, wherein an analog representation of a digital frequency signal, which digital frequency signal is obtained from said digital phase signal by differentiation, is added to an input of said voltage-controlled oscillator, wherein said digital frequency signal is input into said sigma-delta modulator, wherein an output signal of said sigma-delta modulator controls said phase-locked loop, and wherein said phase-locked loop outputs said phase-modulated signal. Said phase modulator then implements two-point modulation, which is based on said digital frequency signal and an analog representation of said digital frequency signal. Said digital frequency signal may for instance be generated from said digital phase signal by a differentiator, which may for instance be comprised in said phase modulator.

According to a further embodiment of the transmitter of the present invention, said analog representation of said digital frequency signal is said second analog signal.

According to a further embodiment of the transmitter of the present invention, said transmitter further comprises a further digital-to-analog converter for converting a digital signal into an analog signal; means arranged for inputting, in said first-type operating mode, a third digital signal into said further digital-to-analog converter to obtain a third analog signal, and for inputting, in said second-type operating mode, a fourth digital signal into said digital-to-analog converter to obtain a fourth analog signal; means arranged for inputting, in said first-type operating mode, said third analog signal into said first-type unit, and for inputting, in said second-type operating mode, said fourth analog signal into said second-type unit; wherein said first-type unit generates said first-type modulated signal in dependence on at least said first and third analog signals, and wherein said second-type unit generates said second-type modulated signal in dependence on at least said second and fourth analog signals. Said first and third analog signals then influence the generation of said first-type modulated signal in said first-type unit during said first-type operating mode, and said second and fourth analog signals then influence the generation of said second-type modulated signal in said second-type unit during said second-type operating mode. In this embodiment, thus two DACs are shared by said first-type and second-type units. It is readily understood that, equally well, further DACs can be shared by said first- and second-type units, and that there may also be DACs that are exclusively used (i.e. not shared) by said first-type unit and said second-type unit.

According to a further embodiment of the transmitter of the present invention, said first and second digital signals are output by a digital signal processor. Said signal processor may for instance generate said first and second digital signals from a sequence of data bits, if said first and second digital signals are data signals. Equally well, said digital signal processor may generate said first and second signals as control signals, for instance for controlling a power control unit or a power supply.

It is further proposed a module for a wireless communication device, comprising a transmitter with the above-described features. Said module may for instance lend itself for modular integration into said wireless communication device during said device's manufacturing process.

It is further proposed a base station in a wireless communications system, comprising a transmitter with the above-described features. Said base station may for instance be a base station in a mobile radio system or an access point in a wireless local area network.

It is further proposed a module for a base station in a wireless communications system, comprising a transmitter with the above-described features. Said module may for instance lend itself for modular integration into said base station during said base station's manufacturing process, or may be an add-on component.

It is further proposed a wireless communication device, comprising a digital-to-analog converter for converting a digital signal into an analog signal; means arranged for inputting, in a first-type operating mode of said wireless communication device, a first digital signal into said digital-to-analog converter to obtain a first analog signal, and for inputting, in a second-type operating mode of said wireless communication device, a second digital signal into said digital-to-analog converter to obtain a second analog signal; a first-type unit for generating a first-type modulated signal in dependence on at least said first analog signal; a second-type unit for generating a second-type modulated signal in dependence on at least said second analog signal, and means arranged for inputting, in said first-type operating mode, said first analog signal into said first-type unit, and for inputting, in said second-type operating mode, said second analog signal into said second-type unit. Said wireless communication device may be any electronic device that is capable of wireless telephony and/or data communication, such as for instance a mobile phone, a personal digital assistant or a computer. Said wireless communication device may for instance be operated according to the GSM standard and/or the UMTS standard.

It is further proposed an integrated circuit, comprising a digital-to-analog converter circuit; a wideband modulation circuit; a narrowband modulation circuit; a switch means arranged for connecting, in a first switch state, a first switch input port with an input of said digital-to-analog converter circuit, and an output of said digital-to-analog converter circuit with an input of said wideband modulation circuit; and for connecting, in a second switch state, a second switch input port with said input of said digital-to-analog converter circuit, and said output of said digital-to-analog converter circuit with an input of said narrowband modulation circuit.

It is further proposed a method for generating modulated signals, said method comprising inputting, in a first-type operating mode, a first digital signal into a digital-to-analog converter to obtain a first analog signal, and for inputting, in a second-type operating mode, a second digital signal into said digital-to-analog converter to obtain a second analog signal; inputting, in said first-type operating mode, said first analog signal into a first-type unit, and inputting, in said second-type operating mode, said second analog signal into a second-type unit; generating, in said first-type operating mode, a first-type modulated signal in said first-type unit in dependence on at least said first analog signal; and generating, in said second-type operating mode, a second-type modulated signal in said second-type unit in dependence on at least said second analog signal.

According to an embodiment of the method of the present invention, said method is executed by a wireless communication device.

It is further proposed a computer program with instructions operable to cause a processor to control the above-described method steps. Said program may for instance be operated by a central processing unit of a wireless communication device.

It is further proposed a computer program product comprising a computer program with instructions operable to cause a processor to control the above-described method steps. Said computer program product may be an electronic, magnetic or optic storage medium.

These and other aspects of the invention will be apparent from and elucidated with reference to the embodiments described hereinafter.

DETAILED DESCRIPTION OF THE INVENTION

The present invention proposes to reuse at least one Digital-to-Analog Converter (DAC) in different operating modes of a multi-mode transmitter. In the following detailed description, the invention will be described by means of embodiments, which are of exemplary nature and shall by no means be considered to limit the scope of applicability of the present invention.

Figure 1:
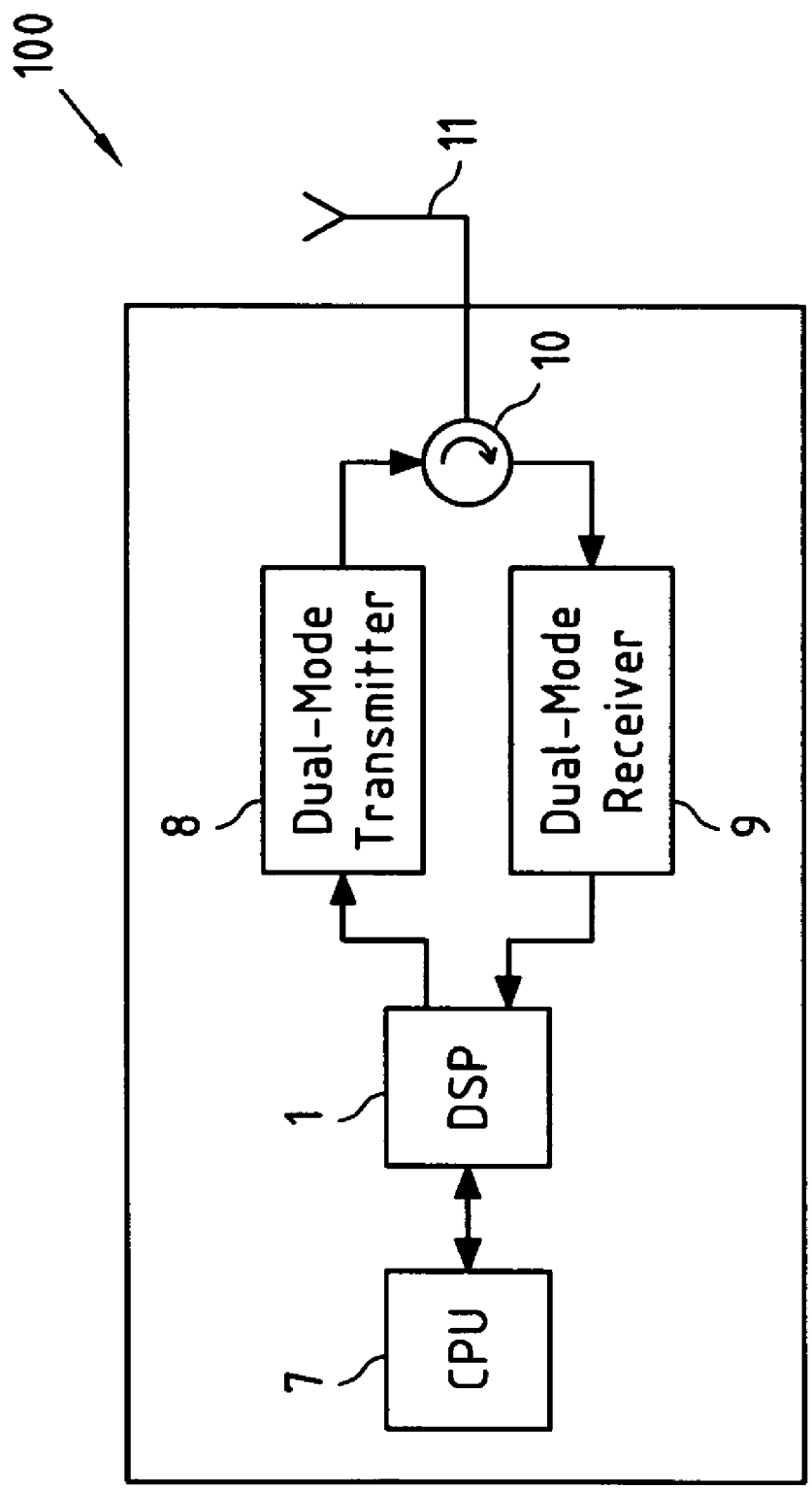
FIG. 1: An exemplary embodiment of a device comprising a dual-mode transmitter according to the prior art and to the present invention.

FIG. 1 schematically depicts an exemplary embodiment of a device 100 comprising a dual-mode transmitter 8, which may either be a dual-mode transmitter according to the prior art (see FIGS. 2 and 4 below), or a dual-mode transmitter according to the present invention (see FIGS. 3 and 5 below). Said device 100 may for instance be a wireless communication device such as for instance a mobile phone in a mobile radio system, or a terminal in a wireless local area network. Said device 100 may equally well be a base station in a mobile radio system or an access point in a wireless local area network. Said device has two operating modes for operation in two different systems, for instance in two different mobile radio systems, or in two different wireless local area networks, or in combinations of both types of systems or further systems.

In said device 100, a dual-mode transmitter may be integrated, for instance as a module 8. Apart from said dual-mode transmitter 8, said device 100 comprises a Central Processing Unit (CPU) 7 for controlling the overall operation of the device 100, including for instance the control of a display and a user interface of said device 100, and the operation of communication protocols required to exchange data with a remote instance, and all types of further tasks required for the operation of said device 100. Said device 100 further comprises a DSP 1, which receives data bits from the CPU 7 and performs operations associated to the transmission of these data bits, for instance baseband processing. Therein, it should be noted that the CPU and DSP may equally well be combined into a single CPU.

The digital output signals generated by DSP 1, which may be data signals and/or control signals, are fed into the dual-mode transmitter 8, and similarly, digital output signals of a dual-mode receiver 9 are received and processed by DSP 1. Both dual-mode transmitter 8 and dual-mode receiver 9 are connected to an antenna 11 for transmission and reception of signals via a coupler 10. It should be noted that more than one antenna may be required for the dual operating modes of the device 100.

Figure 2:
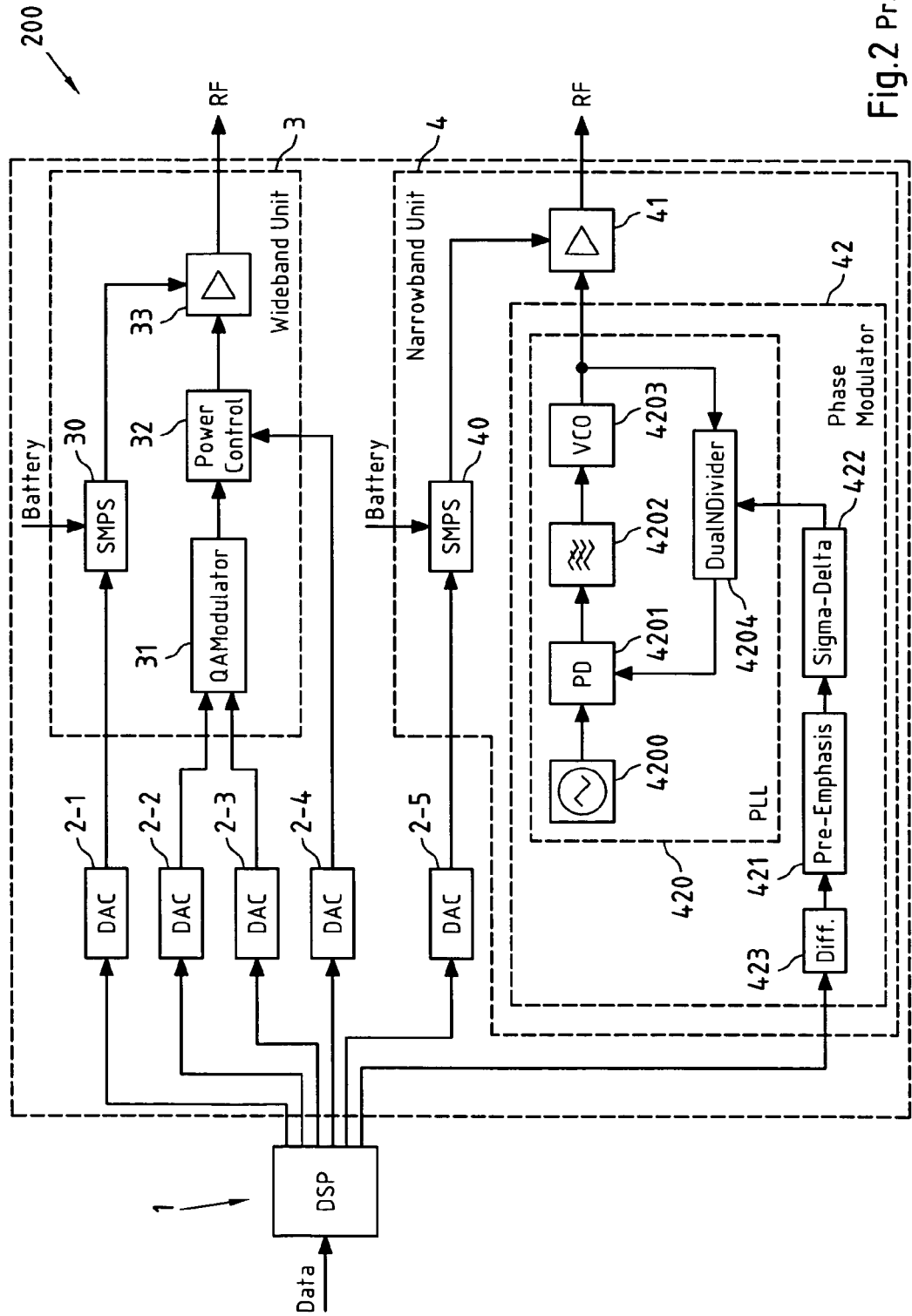
FIG. 2: a dual-mode transmitter according to the prior art.

FIG. 2 schematically depicts a dual-mode transmitter 200 according to the prior art. The transmitter 200 may for instance be integrated as module 8 into the device 100 of FIG. 1. For convenience of presentation, also the DSP 1 and its connections to the transmitter 200 are depicted in FIG. 2. In the following, it will be exemplarily assumed that device 100 (see FIG. 1) is a mobile phone that can be used in mobile communications systems according to both the Universal Mobile Telecommunications System (UMTS) and the Global System for Mobile Communications (GSM) standard. To this end, transmitter 200 comprises a wideband unit 3 for generating a wideband modulated signal according to the Wideband Code Division Multiple Access (W-CDMA) variant of the UMTS standard, and a narrowband unit 4 for generating a narrowband modulated signal according to the GSM standard. The generated modulated wideband or narrowband signals are then forwarded to a Radio Frequency (RF) section, which may for instance comprise one or more antennas for radiating the modulated signals.

The prior art transmitter 200 further comprises a plurality of Digital-to-Analog Converters (DACs) 2-1 . . . 2-5 for converting digital signals into analog signals. These digital signals are output by a DSP 1.

When said mobile phone 100 (see FIG. 1) that comprises said transmitter 200 is operated in the UMTS system, i.e. in a wideband operating mode of said transmitter 200, said DSP 1 receives a sequence of data bits from CPU 7 (see FIG. 1), and converts the data bits into a digital in-phase signal and a digital quadrature signal, that are, after respective conversion to an analog in-phase signal and an analog quadrature signal in the DACs 2-2, 2-3, fed into the wideband unit 3 to obtain the wideband modulated signal.

To this end, the wideband unit 3 comprises a quadrature amplitude modulator 31, which modulates the analog in-phase and quadrature signals by multiplying them with sine and cosine signals and adding the result. The quadrature modulator 31 may be understood to further comprise a spreading instance, wherein the quadrature modulated signal is spread with a spreading code. The resulting signal, which can be considered as a representation of the wideband modulated signal, is then fed into a power control unit 32 for power control, and then into a power amplifier 33 for power amplification. The signal at the output of the power amplifier then may be considered as said wideband modulated signal.

In said wideband operating mode, DSP 1 further outputs a digital power control signal that, after conversion in DAC 2-4, is input into the power control unit 32 to adjust the power level of the wideband modulated signal. DSP 1 also outputs a digital Switching Mode Power Supply (SMPS) control signal that, after conversion in DAC 2-1, is input into a SMPS unit 30 in said wideband unit 3 to control a supply voltage that is provided by said SMPS to the power amplifier 33.

When said mobile phone 100 (see FIG. 1) that comprises said transmitter 200 is operated in the GSM system, i.e. in a narrowband operating mode of said transmitter 200, said DSP 1 receives a sequence of data bits from CPU 7 (see FIG. 1) and converts the data bits into a data signal that is represented by a digital phase signal and a digital amplitude signal. The digital phase signal, and an analog representation of the digital amplitude signal, which is generated by the DAC 2-5, are input into said narrowband unit 4 in order to obtain said narrowband modulated signal, which may for instance be a Phase Shift Keying (PSK) signal, a Frequency Shift Keying (FSK) signal or an Amplitude Shift Keying (ASK) signal. In case of a GSM system, said narrowband modulated signal may for instance be an 8-PSK signal or a Minimum Shift Keying (MSK) signal.

The narrowband unit 4 at least partially implements an Envelope Elimination and Restoration (EER) architecture (also denoted as a polar transmitter). Said EER architecture may for instance be considered to be completed by DSP 1, which performs the elimination of the envelope. Narrowband unit 4 comprises an SMPS 40, a power amplifier 41 and a phase modulator 42. The phase modulator 42 generates a phase-modulated signal based on the digital phase signal obtained from DSP 1, as will be explained in more detail below. This phase-modulated signal is amplified by power amplifier 41, wherein the supply voltage of this power amplifier 41 is controlled by SMPS 40. Feeding SMPS 40 with the analog representation of the digital amplitude signal permits control of the supply voltage of power amplifier 41, and thus the amplification of the phase-modulated signal, in dependence on the digital amplitude signal. In other words, the amplification of the power amplifier 41 is modulated with the digital amplitude signal. In this way, the digital phase signal and the digital amplitude signal, which jointly represent the sequence of data bits as output by CPU 7 (see FIG. 1), are combined into said narrowband modulated signal. As the phase-modulated signal has a constant amplitude, power amplifier 41 may be non-linear. This allows the use of a more efficient power amplifier 41 with a smaller size causing reduced costs. It should be noted that, at the expense of efficiency, SMPS 40 may also be replaced by a linear regulator.

The main reasons for using EER instead of a QA modulator in the narrowband operating mode is the increased efficiency of EER, which leads to a reduced power consumption of said mobile phone 100, and also a cleaner frequency spectrum, which requires less filtering and thus reduces costs. Hence, it would be beneficial to use EER also in the wideband operating mode. However, implementation of EER is difficult for wideband signals, so that it is convenient to have separate narrowband and wideband units.

The basic limiting factor for using EER is the SMPS. In the wideband unit 3, the supply voltage of power amplifier 33 is controlled by SMPS 30 as a function of the average power in order to improve efficiency at low power levels. Thus SMPS 30 can be slow. In contrast, in the narrowband unit 4, a wideband amplitude signal is amplified by SMPS 40, so that SMPS 40 may have to be faster.

In the set-up of FIG. 2, phase modulator 42 is implemented as sigma-delta controlled fractional-N Phase-Locked Loop (PLL) with single-point modulation. To this end, phase modulator 42 comprises a Phase-Locked Loop (PLL) 420, a differentiator 423, a pre-emphasis instance 421 and a sigma-delta modulator 422. Therein, the PLL 420 is controlled by the output signal of sigma-delta modulator 422. Said digital phase signal input into the narrowband unit 4 from DSP 1 is first subject to a differentiation in differentiator 423, which converts the digital phase signal into a digital frequency signal. This differentiation is required because PLL 420 actually implements a frequency-modulator. It is readily understood that, instead of having a differentiator 423 in phase modulator 42, it is equally well possible to dispense with differentiator 423 and to perform the differentiation of the digital phase signal in DSP 1. The digital frequency signal obtained by this differentiation in DSP 1 then may be provided directly into the sigma-delta modulator 422.

Returning to the set-up of FIG. 2, the digital frequency signal as output by differentiator 423 is subject to pre-emphasis (or pre-compensation) in instance 421, and the resulting signal is then input into said sigma-delta modulator 422. The signal that is output by PLL 420 represents the phase-modulated signal that is then amplified by power amplifier 41 according to the amplitude signal to obtain said narrowband modulated signal. Pre-emphasis instance 421 is required to account for the narrowband low-pass response of PLL 420.

The fractional-N PLL 420 comprises a reference frequency generator 4200, a phase detector 4201, a low-pass filter 4202, which may for instance be implemented by an integrator, a voltage-controlled oscillator 4203 and a feedback loop with a dual-modulus divider 4204 for dividing a frequency by two different moduli (i.e. factors), depending on the output signal of sigma-delta modulator 422. The set-up and function of PLL 420 and sigma-delta modulator 421 is known to a person skilled in the art and is thus not discussed here in more detail.

The prior art dual-mode transmitter 200 of FIG. 2 comprises dedicated DACs 2-1 . . . 2-5 for all digital signals that are generated by DSP 1 and fed into said wideband unit 3 and said narrowband unit 4, except for the phase signal that is directly fed into said narrowband unit 4. However, noticing that in said transmitter 200, only one of said wideband unit 3 and said narrowband unit 4 is active at the same time, some or all of the DACs 2-1 . . . 2-5 can be shared in order to reduce the number of required DACs and thus to allow said transmitter 200 to become smaller.

Figure 3:
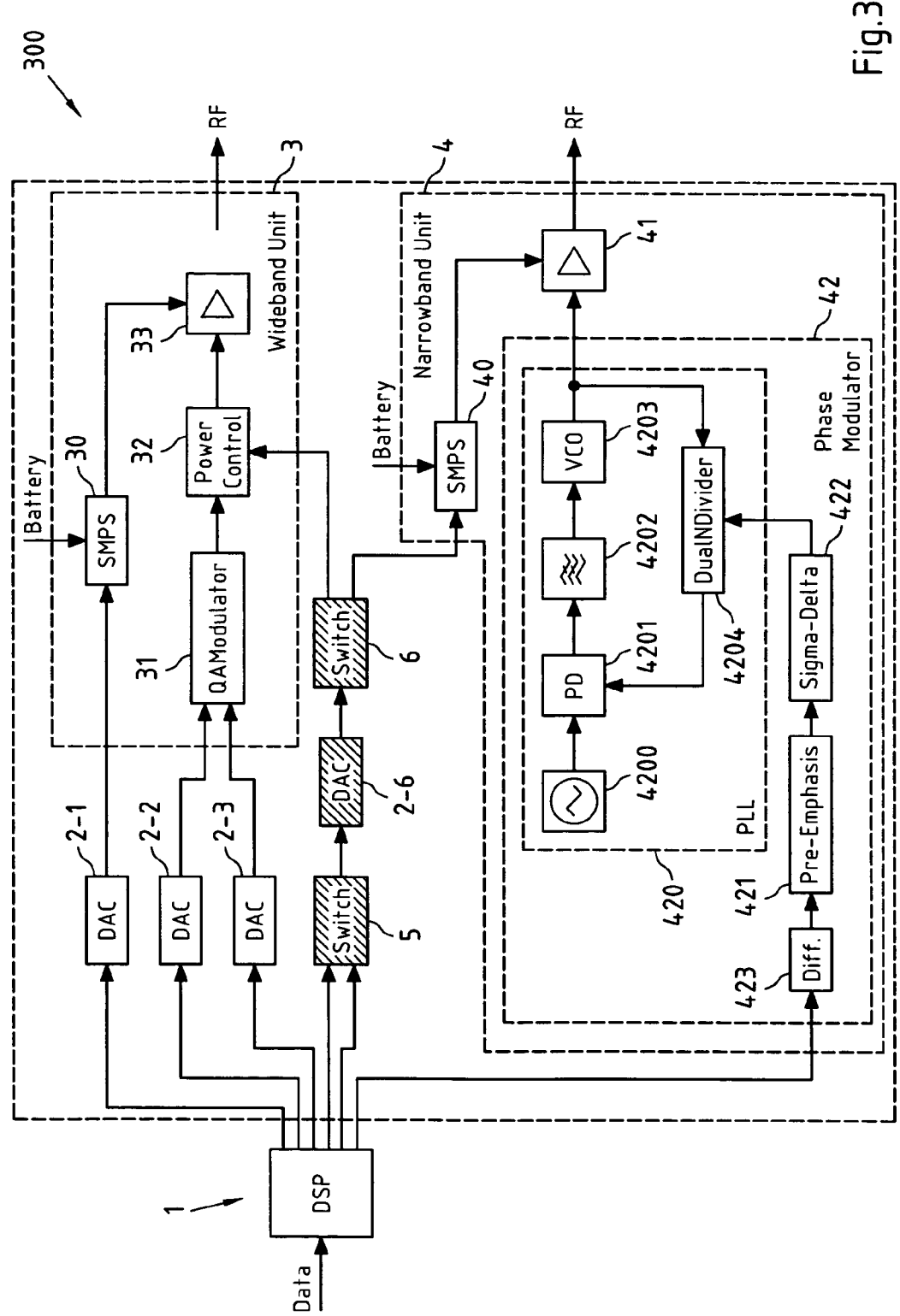
FIG. 3: a first exemplary embodiment of a dual-mode transmitter according to the present invention.

FIG. 3 depicts a first exemplary embodiment of a dual-mode transmitter 300 according to the present invention, wherein the DACs 2-4 and 2-5 of transmitter 200 (see FIG. 2) have exemplarily been substituted by a shared DAC 2-6 and associated switch means 5 and 6. The transmitter 300 according to the present invention may for instance be integrated as module 8 into the device 100 of FIG. 1. In FIG. 3, elements with the same function have been denoted with the same reference numerals as their counterparts in FIG. 2.

The switch means 5 and 6 ensure that, depending on the operating mode of transmitter 300, the correct digital signal is input into the shared DAC 2-6 and that the output signal of the shared DAC 2-6 is fed into the correct unit, i.e. the wideband unit 3 or the narrowband unit 4. For instance, in the wideband operating mode, switch 5 directs the digital power control signal into DAC 2-6 for conversion, and switch 6 then feeds the analog representation of this signal into the power control unit 32 of wideband unit 3. Similarly, in the narrowband operating mode, switch 5 directs the digital amplitude signal to the DAC 2-6 for conversion, and switch 6 then feeds the analog representation of this amplitude signal into the SMPS unit 40 of narrowband unit 4. The control of the switches in dependence on the current operating mode may for instance be performed by DSP 1 or by a CPU of a device that contains said transmitter 300 and said DSP 1.

As the switch means 5, the shared DAC 2-6 and the switch means 6 require significantly less chip area than the DACs 2-4 and 2-5 in the prior art transmitter (see FIG. 2), both the size and, hence, the costs of transmitter 300 can be reduced as compared to prior art. When specifying the shared DAC 2-6, it only has to be considered that the more demanding application (for instance with respect to the bit resolution and/or the maximum available clock frequency) determines the specification of the shared DAC 2-6. It should be noted that the choice to combine DACs 2-4 and 2-5 (see FIG. 2) into a shared DAC 2-6 (see FIG. 3) is arbitrary. Equally well, DAC 2-5 could have been combined with any other DAC 2-1 . . . 2-3 required by the wideband unit 3.

Figure 4:
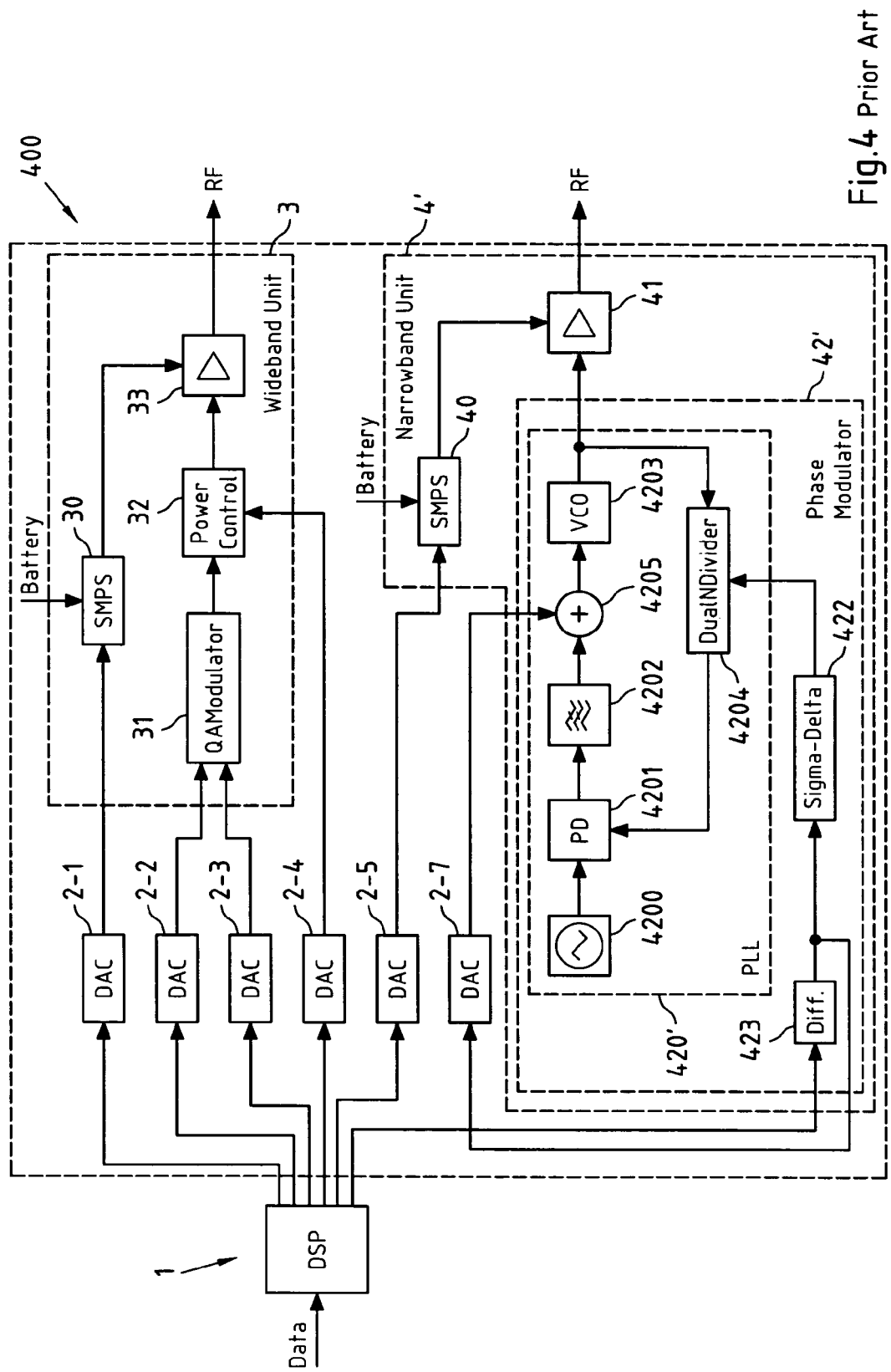
FIG. 4: a further dual-mode transmitter according to the prior art.

FIG. 4 schematically depicts a further dual-mode transmitter 400 according to the prior art, wherein, again, elements with the same function have been denoted with the same reference numerals as their counterparts in FIG. 2. The transmitter 400 of FIG. 4 differs from its counterpart in FIG. 2 only with respect to the narrowband unit 4. This is due to the fact that transmitter 400 uses two-point modulation of the PLL 420 in phase modulator 42, wherein PLL 420 is modulated with the output signal of the sigma-delta modulator 422, and additionally with an analog representation of a digital frequency signal, which is obtained from the digital phase signal by differentiation, and which is added to the input of the VCO 4203 of PLL 420 by means of an adder 4205. In the exemplary set-up of FIG. 4, this digital frequency signal is output by differentiator 423. It is readily understood that said digital frequency signal may equally well be generated by a differentiator that is separate from said differentiator 423. Furthermore, it should be noted that instead of outputting a digital phase signal, said DSP 1 may equally well output a digital frequency signal that is obtained from said digital phase signal by differentiation, and then said digital frequency signal may be fed directly from said DSP 1 into said sigma-delta modulator 422 and to said DAC 2-7 without requiring dedicated differentiators like differentiator 423.

Similar to the set-up of transmitter 200 (see FIG. 2), in the narrowband operating mode, DSP 1 converts a sequence of data bits into a data signal that is represented by a digital phase signal and a digital amplitude signal. The digital phase signal is fed into differentiator 423 to obtain a digital frequency signal. This digital frequency signal is then fed directly, i.e. without pre-emphasis, into said sigma-delta modulator 422. Furthermore, a digital-to-analog converted representation of this digital frequency signal, generated by DAC 2-7, is added to the input of VCO 4203 by means of adder 4205. This adder 4205 may for instance be implemented by means of an operational amplifier. The reason for this two-point modulation of PLL 420 is the need to compensate for the low-pass filtering that is caused by the PLL 420. Alternatively, the single-point modulation as implemented in transmitter 200 of FIG. 2 can be used, but then, however, a pre-emphasis instance 421 is required to account for the low-pass filtering.

As can be readily seen from the prior art dual-mode transmitter 400 of FIG. 4 in comparison to the transmitter 200 of FIG. 2, a further DAC 2-7 is required to accomplish the digital-to-analog conversion of said digital frequency signal that is output by the differentiator 423 and that is used for the two-point modulation of PLL 420. In contrast to the transmitter 200 of FIG. 2, two DACs 2-5 and 2-7 are required in the narrowband operating mode and there now exists a potential to use two DACs both in the wideband and the narrowband operating mode, i.e. two DACs can be shared by the wideband unit 3 and the narrowband unit 4

Figure 5:
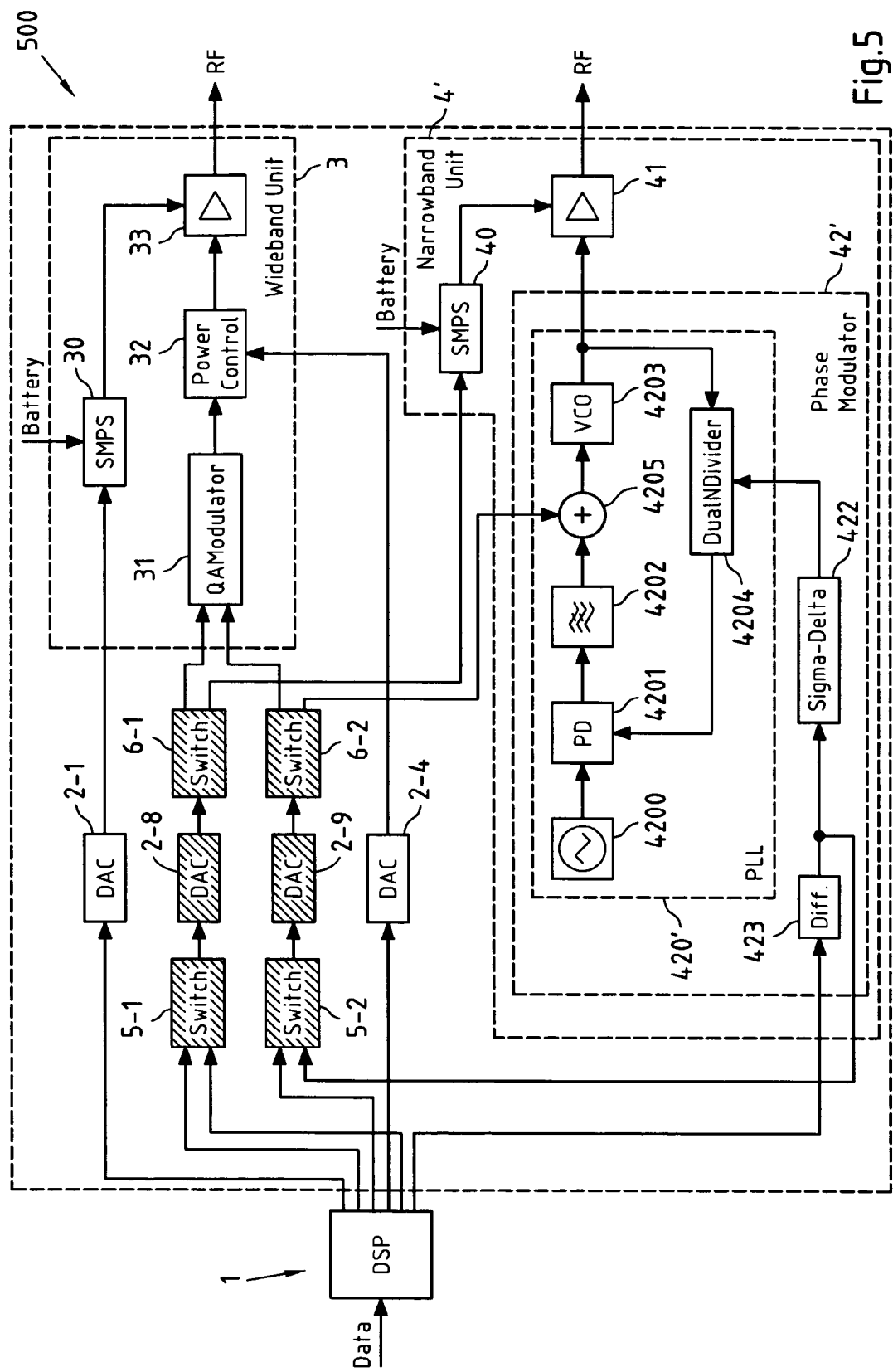
FIG. 5: a second exemplary embodiment of a dual-mode transmitter according to the present invention.

FIG. 5 schematically depicts a second exemplary embodiment of a dual-mode transmitter 500 according to the present invention, where this sharing of two DACs has been implemented. In FIG. 5, elements with the same function have been denoted with the same reference numerals as their counterparts in FIG. 4. It is readily seen that DACs 2-2 and 2-5 (see FIG. 4) have been combined into a shared DAC 2-8 with associated switch means 5-1 and 6-1, and that DACs 2-3 and 2-7 (see FIG. 4) have been combined into a shared DAC 2-9 with associated switch means 5-2 and 6-2. Switches 5-1 and 5-2 are then responsible for the operating-mode-dependent inputting of digital signals into the shared DACs 2-8 and 2-9, and switches 6-1 and 6-2 take care of the operating-mode-dependent inputting of the analog signals produced by the DACs 2-8 and 2-9 to either the wideband unit 3 or the narrowband unit 4. As now four DACs have been combined into two shared DACs, the reduction in chip area achieved with transmitter 500 is even larger than the reduction achieved with transmitter 300 (see FIG. 3).

Figure 6:
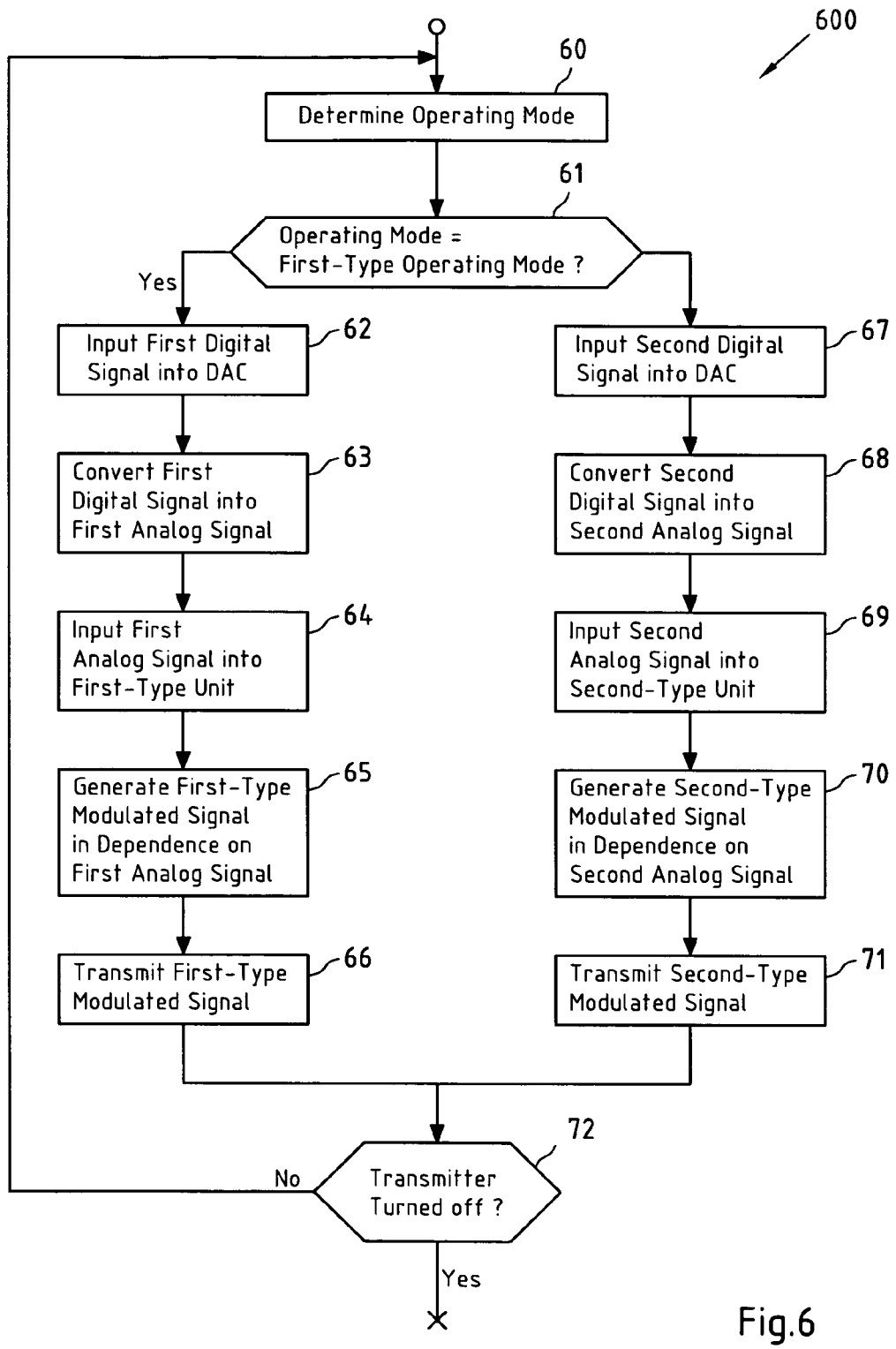
FIG. 6: a flowchart of an exemplary embodiment of a method for generating modulated signals according to the present invention.

Finally, FIG. 6 depicts a flowchart 600 of an exemplary embodiment of a method according to the present invention. The steps of this method may for instance be performed by CPU 7 (see FIG. 1) of device 100, or DSP 1, or both.

In a first step 60, an operating mode of said transmitter is determined. This may either be a first-type operating mode, e.g. a wideband operation mode using a wideband unit such as in the transmitter 300 of FIG. 3, or a second-type operating mode, e.g. a narrowband operating mode using a narrowband unit such as in the transmitter 300 of FIG. 3. If said operating mode is the first-type (wideband) operating mode, which is checked in step 61, the steps 62-66 for the first-type operating mode are subsequently processed, otherwise, the steps 67-71 for the second-type (narrowband) operating mode are subsequently processed.

In step 62, a first digital signal is input into the DAC, which may for instance be the shared DAC 2-6 according to FIG. 3, and said first digital signal may then be the digital power control signal generated by DSP 1 (see FIG. 3) and input into the shared DAC 2-6 by the switch means 5.

In step 63, the first digital signal is then digital-to-analog converted into a first analog signal by the DAC.

In step 64, this first analog signal is then input into a first-type unit, which, to remain in the example of FIG. 3, may then be the wideband unit 3.

In step 65, a first-type modulated signal is then generated in said first-type unit in dependence on said first analog signal. To stay in the example of FIG. 3, thus said wideband unit generates said wideband modulated signal in dependence on said analog power control signal (and said digital in-phase and quadrature signals).

In step 66, said first-type modulated signal is then transmitted.

In case of said second-type operating mode, steps 67-71 are processed, i.e. a second digital input signal is input into the DAC (step 67), converted into a second analog signal (step 68) and input into the second-type unit (step 69), a second-type modulated signal is generated in the second-type unit in dependence on said second analog signal (step 70), and then the second-type modulated signal is transmitted (step 71). With respect to the example of FIG. 3, the steps 67-71 represent the operation of the transmitter 300 in the narrowband operating mode, i.e. input of the digital amplitude signal into the shared DAC 2-6 by switch 5, conversion into an analog representation in the shared DAC 2-6, input of the analog representation of the digital amplitude signal into the narrowband unit 4 by switch 6, generation of the narrowband modulated signal in narrowband unit 4 in dependence on the analog representation of the digital amplitude signal (and the digital frequency signal), and transmission of the narrowband modulated signal.

After the steps 62-66 of the first-type operating mode or the steps 67-71 of the second-type operating mode, it is determined in a step 72 if the transmitter is turned off. If this is the case, the flowchart terminates. Otherwise, the flowchart loops back to step 60 and starts anew.

The invention has been described above by means of exemplary embodiments. It should be noted that there are alternative ways and variations which should be evident to any person skilled in the art and can be implemented without deviating from the scope and spirit of the appended claims. In particular, the present invention is not limited to deployment in mobile phones only, it may equally well be deployed in all other types of devices that require multi-mode transmitters, such as for instance laptop and desktop computers, personal digital assistants or similar devices. Equally well, the present invention can be deployed in base stations of mobile radio systems, or in mobile terminals and access points in wireless local area networks. The present invention may equally well be deployed in wired networks with different transmission modes that are not operated concurrently.

The invention claimed is:

1. A transmitter, comprising:
   a digital-to-analog converter for converting a digital signal into an analog signal;
   a first switch arranged for inputting, in a first-type operating mode of said transmitter, a first digital signal into said digital-to-analog converter to obtain a first analog signal, and for inputting, in a second-type operating mode of said transmitter, a second digital signal into said digital-to-analog converter to obtain a second analog signal;
   a first-type unit for generating a first-type modulated signal in dependence on at least said first analog signal;
   a second-type unit for generating a second-type modulated signal in dependence on at least said second analog signal, and
   a second switch arranged for inputting, in said first-type operating mode, said first analog signal into said first-type unit, and for inputting, in said second-type operating mode, said second analog signal into said second-type unit.

2. The transmitter according to claim 1, wherein said first-type modulated signal is a wideband modulated signal, and wherein said second-type modulated signal is a narrowband modulated signal.

3. The transmitter according to claim 2, wherein said wideband modulated signal is a spread spectrum signal.

4. The transmitter according to claim 1, wherein said first-type unit comprises a power control unit for controlling a power of said first-type modulated signal, and wherein said first analog signal controls said power control unit.

5. The transmitter according to claim 1, wherein said first-type unit comprises a power amplifier for amplifying a power of said first-type modulated signal, and wherein said first analog signal controls a supply voltage for said power amplifier via a switching mode power supply unit.

6. The transmitter according to claim 1, wherein said first-type unit comprises a modulator that generates at least a representation of said first-type modulated signal as a quadrature-amplitude modulated signal from an analog quadrature signal and an analog in-phase signal that are input into said modulator, and wherein said first analog signal is one of said analog quadrature signal and said analog in-phase signal.

7. The transmitter according to claim 1, wherein said second-type unit comprises a modulator for at least partially performing envelope elimination and restoration at least partially based on said second analog signal to obtain said second-type modulated signal.

8. The transmitter according to claim 7, wherein said modulator comprises a phase modulator for generating a phase-modulated signal based on a digital phase signal of a data signal, and a power amplifier for amplifying a power of said phase-modulated signal, and wherein a supply voltage for said power amplifier is controlled by an analog representation of a digital amplitude signal of said data signal via a switching mode power supply unit.

9. The transmitter according to claim 8, wherein said analog representation of said digital amplitude signal of said data signal is said second analog signal.

10. The transmitter according to claim 8, wherein said phase modulator comprises a phase-locked loop, a pre-emphasis instance and a sigma-delta modulator, wherein a digital frequency signal, which is obtained from said digital phase signal by differentiation, is emphasized in said pre-emphasis instance and then input into said sigma-delta modulator, wherein an output signal of said sigma-delta modulator controls said phase-locked loop, and wherein said phase-locked loop outputs said phase-modulated signal.

11. The transmitter according to claim 8, wherein said phase modulator comprises a phase-locked loop and a sigma-delta modulator, wherein said phase-locked loop comprises a voltage controlled oscillator, wherein an analog representation of a digital frequency signal, which digital frequency signal is obtained from said digital phase signal by differentiation, is added to an input of said voltage-controlled oscillator, wherein said digital frequency signal is input into said sigma-delta modulator, wherein an output signal of said sigma-delta modulator controls said phase-locked loop, and wherein said phase-locked loop outputs said phase-modulated signal.

12. The transmitter according to claim 11, wherein said analog representation of said digital frequency signal is said second analog signal.

13. The transmitter according to claim 1, further comprising:
   a further digital-to-analog converter for converting a digital signal into an analog signal;
   a third switch arranged for inputting, in said first-type operating mode, a third digital signal into said further digital-to-analog converter to obtain a third analog signal, and for inputting, in said second-type operating mode, a fourth digital signal into said further digital-to-analog converter to obtain a fourth analog signal; and
   a fourth switch arranged for inputting, in said first-type operating mode, said third analog signal into said first-type unit, and for inputting, in said second-type operating mode, said fourth analog signal into said second-type unit,
   wherein said first-type unit generates said first-type modulated signal in dependence on at least said first and third analog signals, and wherein said second-type unit generates said second-type modulated signal in dependence on at least said second and fourth analog signals.

14. The transmitter according to claim 1, wherein said first and second digital signals are output by a digital signal processor.

15. A module for a wireless communication device, comprising a transmitter according to claim 1.

16. A base station in a wireless communications system, comprising a transmitter according to claim 1.

17. A module for a base station in a wireless communications system, comprising a transmitter according to claim 1.

18. A wireless communication device, comprising:
a digital-to-analog converter for converting a digital signal into an analog signal;
a first switch arranged for inputting, in a first-type operating mode of said wireless communication device, a first digital signal into said digital-to-analog converter to obtain a first analog signal, and for inputting, in a second-type operating mode of said wireless communication device, a second digital signal into said digital-to-analog converter to obtain a second analog signal;
a first-type unit for generating a first-type modulated signal in dependence on at least said first analog signal;
a second-type unit for generating a second-type modulated signal in dependence on at least said second analog signal, and
a second switch arranged for inputting, in said first-type operating mode, said first analog signal into said first-type unit, and for inputting, in said second-type operating mode, said second analog signal into said second-type unit.

19. An integrated circuit, comprising:
a digital-to-analog converter circuit;
a wideband modulation circuit;
a narrowband modulation circuit;
a switch circuit arranged for connecting, in a first switch state, a first switch input port with an input of said digital-to-analog converter circuit, and an output of said digital-to-analog converter circuit with an input of said wideband modulation circuit; and for connecting, in a second switch state, a second switch input port with said input of said digital-to-analog converter circuit, and said output of said digital-to-analog converter circuit with an input of said narrowband modulation circuit.

20. A method for generating modulated signals, said method comprising: in a first-type operating mode,
inputting a first digital signal into a digital-to-analog converter to obtain a first analog signal,
inputting said first analog signal into a first-type unit, and
generating a first-type modulated signal in said first-type unit in dependence on at least said first analog signal;
in a second-type operating mode,
inputting a second digital signal into said digital-to-analog converter to obtain a second analog signal,
inputting said second analog signal into a second-type unit, and
generating a second-type modulated signal in said second-type unit in dependence on at least said second analog signal.

21. The method according to claim 20, wherein said method is executed by a wireless communication device.

22. A computer program product comprising computer readable storage medium storing program codes thereon for use in a processor, said program codes comprise instructions for the processor to control the execution of the method of claim 20.

23. A transmitter, comprising:
means for converting a digital signal into an analog signal;
means arranged for inputting, in a first-type operating mode of said transmitter, a first digital signal into said means for converting to obtain a first analog signal, and for inputting, in a second-type operating mode of said transmitter, a second digital signal into said means for converting to obtain a second analog signal;
means for generating a first-type modulated signal in dependence on at least said first analog signal;
means for generating a second-type modulated signal in dependence on at least said second analog signal, and
means arranged for inputting, in said first-type operating mode, said first analog signal into said means for generating the first-type modulated signal, and for inputting, in said second-type operating mode, said second analog signal into said means for generating the second-type modulated signal.

24. The transmitter according to claim 23, further comprising:
a further means for converting a digital signal into an analog signal;
means arranged for inputting, in said first-type operating mode, a third digital signal into said further means for converting to obtain a third analog signal, and for inputting, in said second-type operating mode, a fourth digital signal into said further means for converting to obtain a fourth analog signal; and
means arranged for inputting, in said first-type operating mode, said third analog signal into said means for generating the first-type modulated signal, and for inputting, in said second-type operating mode, said fourth analog signal into said means for generating the second-type modulated signal,
wherein said means for generating the first-type modulated signal generates said first-type modulated signal in dependence on at least said first and third analog signals, and
wherein said means for generating the second-type modulated signal generates said second-type modulated signal in dependence on at least said second and fourth analog signals.

* * * * *